(12) United States Patent
Beguin et al.

(10) Patent No.: US 6,411,759 B1
(45) Date of Patent: Jun. 25, 2002

(54) METHOD FOR CONNECTING OPTICAL FIBER AND OPTICAL WAVEGUIDE

(75) Inventors: Alain Marcel Beguin, Vulaines sur Seine; Bertrand Paris, Avon; Felice Scotta, Savigny le Temple, all of (FR)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 09/647,855

(22) PCT Filed: Apr. 9, 1999

(86) PCT No.: PCT/EP99/02421

§ 371 (c)(1),
(2), (4) Date: Oct. 4, 2000

(87) PCT Pub. No.: WO99/53351

PCT Pub. Date: Oct. 21, 1999

(30) Foreign Application Priority Data

Apr. 9, 1998 (FR) .............................................. 98/04438

(51) Int. Cl.⁷ ................................................. G02B 6/30
(52) U.S. Cl. ........................................... 385/49; 385/96
(58) Field of Search ........................ 385/49, 14, 95–98

(56) References Cited

U.S. PATENT DOCUMENTS

| | | | |
|---|---|---|---|
| 5,781,676 A | * 7/1998 | Okada | 385/31 |
| 6,033,515 A | * 3/2000 | Walters et al. | 156/272.8 |
| 6,081,640 A | * 6/2000 | Ouellette et al. | 385/37 |
| 6,268,585 B1 | * 7/2001 | Ichikawa et al. | 219/121.69 |
| 6,292,609 B1 | * 9/2001 | Matsushima et al. | 385/43 |

* cited by examiner

Primary Examiner—Brian Sircus
Assistant Examiner—Hae Moon Hyeon
(74) Attorney, Agent, or Firm—Eric M. Smith (57) ABSTRACT

A fusion joint between a waveguide (1a) and an optical fiber (2) is created by irradiating the interface (4) between the optical fiber and the waveguide using a laser beam. The spatial distribution of the energy furnished to the interface presents a central zone of which the energy is reduced with respect to a peripheral zone, whereby to enable a relatively high energy laser to be used while avoiding bending of the waveguide. The laser beam is caused to irradiate a higher energy density upon the waveguide than the optical fiber, typically by offsetting the center of the laser beam towards the waveguide. The fusion is performed while a force F urges the waveguide and optical fiber towards one another, so as to avoid the creation of a void at the boundary. A supplementary polymer or mineral joint can be provided. A method for multi-fiber fusion pigtailing more than a single optical fiber to respective waveguiding regions in a planar waveguide includes using a diffractive optical element (130) to produce a multiple energy distribution.

30 Claims, 6 Drawing Sheets

METHOD FOR CONNECTING OPTICAL FIBER AND OPTICAL WAVEGUIDE

BACKGROUND OF THE INVENTION

1. Field of the Invention

The present invention generally relates to the field of high speed fiber optical communications, and more particularly to methods for joining optical fibers with integrated optical waveguides.

2. Technical Background

It is typical to connect an optical fiber to an optical waveguide, for instance, when preparing an integrated optics device for use in a communications system or network. The term "optical waveguide" is used herein, in distinction to the expression "optical fiber," to designate a lightguiding medium typically formed on or in a planar (silica) substrate of rectangular cross-section (or a chip as referred to interchangeably herein). Note that the term "planar waveguide" conventionally refers to a unit comprising a core and a cladding region; that is, a light path and the substrate in or on which the light path resides; however, in the present application a distinction will be made between the lightpath ("waveguide") and the substrate (or chip) when appropriate to avoid confusion. Typically, the light guiding region (core) extends to the edge or extremity of the chip. Waveguides of this type are frequently encountered in integrated optics applications, for example, as components of a multiplexer or demultiplexer or, more generally, as part of an integrated optical circuit.

The conventional fusion technique for connecting optical fibers together makes use of an electric arc discharge. However, this technique is not suitable for connecting an optical fiber to a waveguide due to the geometrical characteristics of the waveguide and the heat capacity of the waveguide which is higher than that of the optical fiber. Accordingly, it has been proposed to connect an optical fiber to a planar type silica waveguide by bringing the elements into abutment and applying a laser beam to cause them to fuse together. However, a further problem arises; namely, a high energy laser beam used to create the fusion joint can cause the waveguide core to bend and, moreover, excessive melting of the optical fiber can occur. On the other hand, if a lower energy laser beam is utilized, then the joint between the waveguide and the optical fiber has less strength than required for deployed applications.

One proposed approach to solving the above problem is to pre-heat the waveguide by means other than the laser beam used for effecting the fusion between the waveguide and the optical fiber. Such pre-heating makes it possible to reduce the power of the laser beam needed to create the fusion connection. However, such an approach complicates the process for forming the fusion joint and, in many cases, requires the use of specialised equipment and/or the modification of the structure of the integrated optical component to be connected to the optical fiber.

Another consideration is the ever increasing demands being placed on optical communications technology which have complicated the hardware and software involved, and placed great emphasis on achieving more efficient manufacturing and deployment. For example, the growth of metro networks and the associated signal routing, add/drop and switching requirements for narrowband Wavelength Division Multiplexer (WDM) systems employing 16, 32, or 40 or more channels now makes it advantageous to be able to connect multiple fibers to respective waveguides (referred to hereinafter as "multi-fiber fusion pigtailing") with good performance characteristics, accuracy, repeatability, and efficiency rather than single fiber/waveguide connections.

The present invention provides a method for forming an accurate fusion joint between an optical fiber and an optical waveguide in a chip, with low optical losses and a strong joint.

The invention further provides a method for accurately performing multi-fiber fusion pigtailing between multiple fibers and multiple waveguides in a chip, with low optical losses and strong joints.

SUMMARY OF THE INVENTION

An embodiment of the present invention provides a method for connecting an optical fiber to an optical waveguide in a chip, including the steps of aligning the optical fiber with the waveguide, bringing the optical fiber and waveguide into abutment, and irradiating a zone of abutment between the optical fiber and the waveguide with a laser beam having a sufficient power and a desired spatial energy distribution; and blocking a portion of the laser beam such that the energy corresponding to a substantially central part of the spatial energy distribution is reduced with respect to the energy corresponding to a peripheral part of the spatial energy distribution in the beam at the zone of abutment.

An aspect of this embodiment of the invention involves interposing a shield element in the path of the laser beam upstream of the zone of abutment in order to eliminate a substantially central part of the laser beam while allowing a peripheral part thereof to pass.

According to another aspect of the invention, the step of reducing the energy in the substantially central part of the spatial energy distribution with respect to the peripheral part is carried out by dividing the laser beam, upstream of the zone of abutment, into several distinct beams, and directing these beams towards the zone of abutment. This can be done, for example, by a splitting mirror disposed in the path of the laser beam upstream of the zone of abutment, with the distinct beams then directed towards the zone of abutment by parabolic mirrors. The distinct beams resulting from the splitting of the laser beam can be slightly defocused at the zone of abutment.

Another aspect of the invention relates to accurately positioning the zone of abutment with respect to the location of a focused or slightly defocused laser beam for fusing the waveguide to the optical fiber. This method aspect involves the steps of obtaining an image of the laser beam on the waveguide chip surface and generating a set of coordinates $x_1$, $y_1$, corresponding to the position of the approximate center of the laser beam. The coordinates $x_1$ and $y_1$ are set off from a border or extremity of the chip by respective amounts $\Delta x$, $\Delta y$. A second set of coordinates, $x_2$ and $y_2$, which represent the extremity position of the waveguide, are then determined and the waveguide extremity and abutted fiber are manually or automatically located at a position $\Delta X = x_2 - x_1$, $\Delta Y = y_2 - y_1$; that is, the zone of abutment is optimally and accurately positioned in the fusion region of the laser beam. The image of the laser beam on the chip is obtained by a camera which is stationary, along with the laser, relative to the chip and the fiber. Preferably, several images are taken in sequential time order. The positioning method according to the invention provides a positioning accuracy of the zone of abutment of greater than about plus or minus one micron.

In another embodiment of the invention, a method for connecting a plurality of optical fibers to a respective plurality of waveguides in a chip includes the steps of propagating a substantially collimated laser beam through a diffractive optical element (DOE) to simultaneously produce a desired spatial laser energy distribution at a zone of abutment for each of the fiber-waveguide connections.

An aspect of this embodiment provides a method for accurately positioning the energy distributions of the laser beams at each zone of abutment and includes the positioning steps referred to in the positioning aspect described above.

The invention described herein provides a method for strongly, accurately, and efficiently connecting an optical fiber to a waveguide in an optical chip.

In each of the aspects of this embodiment, the energy distribution at the zone of abutment is asymmetrical; that is, the energy impinging upon the waveguide is greater than that which reaches the optical fiber. In this way, the degree of melting of the optical fiber can be controlled.

In another aspect of the embodiment of the invention, a force is applied between the optical fiber and the waveguide in a direction moving the optical fiber and waveguide closer together during the irradiation of the zone of abutment.

In a further aspect, the power cycle of the laser is controlled such that the laser beam power is held at a first, relatively higher level during a first period of time during which the fusion joint is created, and is maintained at a lower level during a second period of time subsequent to the first period of time, allowing gradual cooling of the fusion joint.

The methods of the present invention find application in connecting optical fibers to planar silica waveguides. In order to ensure absorption of the laser energy by the waveguide material, the irradiation step is performed using a laser beam of wavelength greater than 4 $\mu$m. Suitable lasers include a Carbon Monoxide (CO) laser having a wavelength of 9.8 $\mu$m, and a Carbon Dioxide ($CO_2$) laser having a wavelength of 10.6 $\mu$m. Use of a $CO_2$ laser currently provides a cost advantage.

Additional features and advantages of the invention will be set forth in the detailed description which follows, and in part will be readily apparent to those skilled in the art from the description or recognized by practicing the invention as described in the written description and claims hereof, as well as the appended drawings.

It is to be understood that both the foregoing general description and the following detailed description are merely exemplary of the invention, and are intended to provide an overview or framework to understanding the nature and character of the invention as it is claimed.

The accompanying drawings are included to provide a further understanding of the invention, and are incorporated in and constitute a part of this specification. The drawings illustrate embodiments of the invention, and together with the description serve to explain the principles and operation of the invention.

DETAILED DESCRIPTION OF PREFERRED EMBODIMENTS

Reference will now be made in detail to the present preferred embodiments of the invention, examples of which are illustrated in the accompanying drawings. Wherever possible, the same reference numbers will be used throughout the drawings to refer to the same or like parts.

Figures 1, 2:
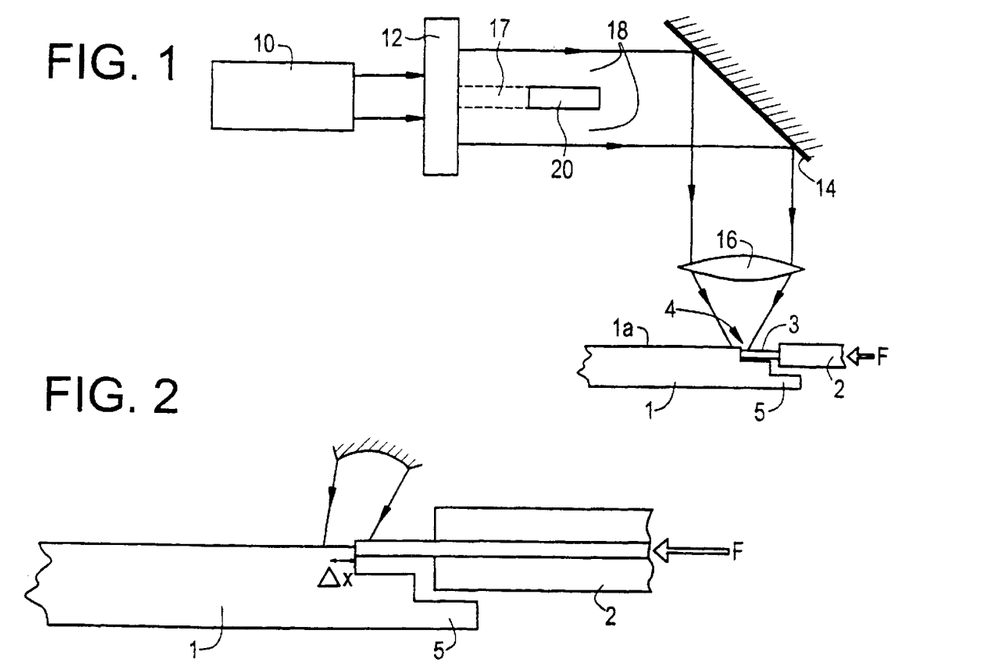
FIG. 1 is a diagram illustrating the general disposition of the apparatus used to put into practice an embodiment of the invention.
FIG. 2 is a diagram schematically illustrating the offset of the laser beam with respect to the boundary between the optical fiber and the waveguide according to an embodiment of the invention.
Figure 6A:
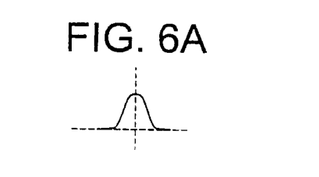
FIGS. 6A, 6B and 6C show laser beam energy distribution profiles.
Figure 6B:
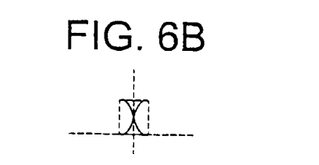
Figure 6C:
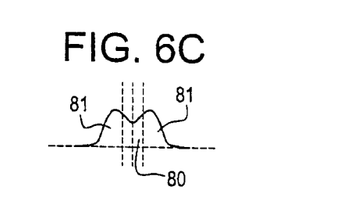

An exemplary embodiment of the method for connecting an optical fiber to an optical waveguide formed in a chip according to the present invention can be put into practice using the method described herein in conjunction with the apparatus illustrated in FIG. 1. This apparatus and method are used to form a fusion joint between a silica waveguide 1a provided on a silica substrate 1 (constituting an integrated optics chip) and the end 3 of an optical fiber 2 aligned with the waveguide 1a. The end 3 of the optical fiber 2 is stripped, i.e. the sheath protecting the latter is removed to expose the silica part of the fiber. The end of the chip 1 preferably has a stepped portion 5 to accommodate the stripped end 3 and the non-stripped portion of the optical fiber 2. A $CO_2$ laser 10 generates a laser beam which is expanded and collimated by a magnifying/collimating component 12, reflected by a mirror 14 and focused by a lens (or lens system) 16. The laser beam is focused Substantially onto the interface 4 between the optical fiber and the waveguide, hereinafter referred to interchangeably as the zone of abutment or interface. The energy furnished by the laser beam to the zone of abutment 4 between the waveguide la and the stripped end 3 of the optical fiber 2 presents a spatial distribution in which the energy corresponding to a substantially central part thereof is reduced with respect to that corresponding to a peripheral part, as illustrated in FIG. 6C, The term "substantially central part" is understood to mean a central zone or one slightly offset relatively to the center of the energy distribution of the beam.

To achieve such a spatial energy distribution a beam blocking or shield element 20 of preferably substantially cylindrical shape is disposed in the path of the laser beam advantageously after enlargement and collimation by magnifying/collimating component 12 but before focusing by element 16. ID this way, the energy density falling upon the shield element 20 is lower than in the case where the shield element were to be positioned before the magnification unit or after the focusing lens 16. This placement reduces local heating effects in the shield member 20. Moreover, by locating the shield element 20 at a point in the optical path of the laser beam where the diameter thereof is relatively great, there is increased accuracy in the centering of the shield element 20 with respect to the laser beam. In FIG. 1 the shield element 20 is located between the magnification unit 12 and the mirror 14 but, in another aspect, it could be located between the mirror 14 and lens 16. The shield element 20 prevents a substantially central part 17 of the laser beam emitted by the laser 10 to reach the interface 4. The shield element 20 eliminates the energy corresponding to this substantially central part 17, while letting the remaining peripheral part 18 of the beam propagate towards the interface 4. Taking into account the Gaussian distribution of the energy through the cross-section of the laser beam, the shielding or blocking of the central part 17 of the laser beam makes it possible to eliminate a high proportion of the energy in the central portion of the beam. Preferably, the diameter and the position of the shield element 20 are selected such that 20 to 80% of the energy of the beam emitted by the laser 10, and more preferably about 50% of the energy, is prevented from reaching the elements intended to be fused at the interface 4. The shield element 20 should have good thermal conductivity so that it can dissipate the significant energy produced by the laser beam. Preferably, the length of the shield element 20 is selected to be as great as is practically possible, in view of the desired size of the whole device, in order to optimise energy dissipation therein. In an exemplary aspect, the diameter and the length of the element 20 are. 5 mm and 10 mm, respectively. In addition, the material of the shield element has a low deformation when it is heated in order to ensure that the quantity of energy eliminated from the laser beam and the spatial distribution of the remaining energy are stable and reproducible. Steel and carbon are suitable exemplary materials for element 20.

The chip 1 incorporating the waveguide 1a, and the optical fiber 2, are mounted on respective micro-positioning stages (not shown), positioned to abut against one another and aligned in a conventional manner (typically by a conventional method which maximises light transmitted between the optical fiber and the waveguide) as illustrated in FIG. 2. With the optical fiber end 3 and chip 1/waveguide 1a in abutment at the interface 4, the chip and fiber are positioned with respect to the laser beam as described in greater detail below. The $CO_2$ laser 10 is activated so as to generate, at a first, higher power level, a laser beam having a beam diameter of about 3.5 mm which is expanded by the magnifying/collimating component 12 to a diameter of about 14 mm, reflected by the mirror 14 and focused by the lens (or the lens system) 16 substantially on the interface, or zone of abutment, 4 between the optical fiber 3 and the waveguide 1a. The diameter of the laser beam after focusing by the element 16 is typically of the order of 150–400 $\mu$m. The laser beam is preferably slightly defocused at the zone of abutment 4, in order to render the spot produced by the beam slightly blurred at this zone.

Due to the presence of the shield element 20 in the optical path of the laser beam, approximately 50% of the beam energy produced by the laser 10 is prevented from propagating towards the elements to be fused. Thus a relatively high power laser beam can be used in the process without causing bending of the waveguide core. Preferably, the spot produced by the laser beam at the zone of abutment 4 is not strictly centered on the boundary of the optical fiber 2 and the waveguide 1a, but instead is offset in the direction towards the waveguide by a distance $\Delta x$. This offset ensures that a greater fraction of the beam energy reaches the waveguide 1a than the optical fiber 2 which, due to its specific heat capacity being lower than that of the waveguide, would tend to melt to an undesirable degree. In a typical case such as where the diameter of the laser beam at the interface is around 350 $\mu$m, the offset $\Delta x$ should be between about 20–60 $\mu$m. Such a value of the offset ensures that the desired temperature distribution is effected. In particular, it is thus possible to take the waveguide and the optical fiber to the same temperature.

Figure 3:
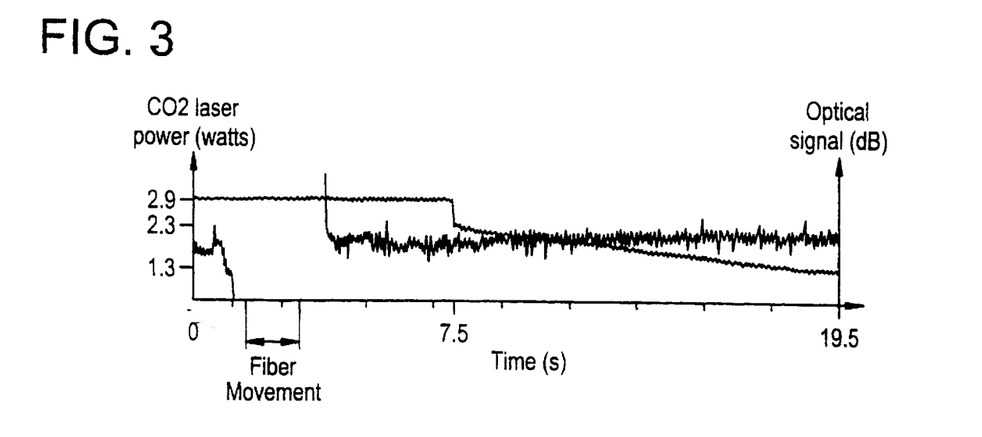
FIG. 3 is a graph illustrating a typical operating cycle of the laser according to an embodiment of the invention.

Furthermore, the laser beam is set at a first power level which is relatively high in order to cause local melting of the waveguide 1a and optical fiber end 3 at the boundary 4, as shown in FIG. 3. A force, F, is applied so as to exert a gentle pressure urging the optical fiber towards the waveguide. Alternatively, the force F may be applied on the waveguide, or complementary forces may be applied on the waveguide and optical fiber 2. In the absence of the application of a relative force between the waveguide and the optical fiber urging them towards each other, it has been found that the end 3 of the optical fiber 2 deforms upon melting so as to create an empty space between the optical fiber and the waveguide. Thus application of the force F is desirable in order to produce a strong fusion joint with low optical losses. Typically, the application of force F causes a relative displacement between the optical fiber 2 and the waveguide 1a during the fusion process, this relative displacement being able to go up to about 50 $\mu$m. As a result of this relative displacement, the end 3 of the optical fiber 2 may penetrate slightly into the material of the waveguide. This further reinforces the strength of the fusion joint. After the fusion of the waveguide 1a and optical fiber 2, the power of the laser beam is reduced to a lower level and, preferably, this power level is gradually reduced still further during a relatively long period of time in order to allow the fusion joint to cool down gradually. In this way, stresses in the fusion joint are reduced. FIG. 3 illustrates a typical power cycle of the $CO_2$ laser during a cycle of the method according to the present invention. FIG. 3 also indicates the time period during which the application of force F causes movement of the fiber 2 towards the waveguide 1a, and the level of an optical signal transmitted between the fiber 2 and waveguide 1a for purposes of monitoring the progression of the connection process. It can be seen that the various steps of the connection cycle are very short. Therefore it is preferred that the displacements of the micro-positioning stages, and the power cycle of the laser, be computer-controlled. Typically, the power cycle of the laser is controlled by controlling the excitation current thereof using a control signal. Conventionally, the level of this control signal can in turn be fixed by varying a regulation current or voltage, depending upon the detailed implementation of the control unit, all of which is understood by those skilled in the art.

Figure 4:
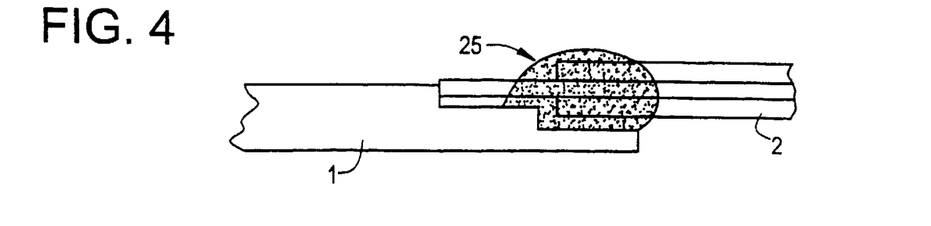
FIG. 4 is diagram showing a further joint between the optical fiber and the waveguide according to an embodiment of the invention.
Figure 14:
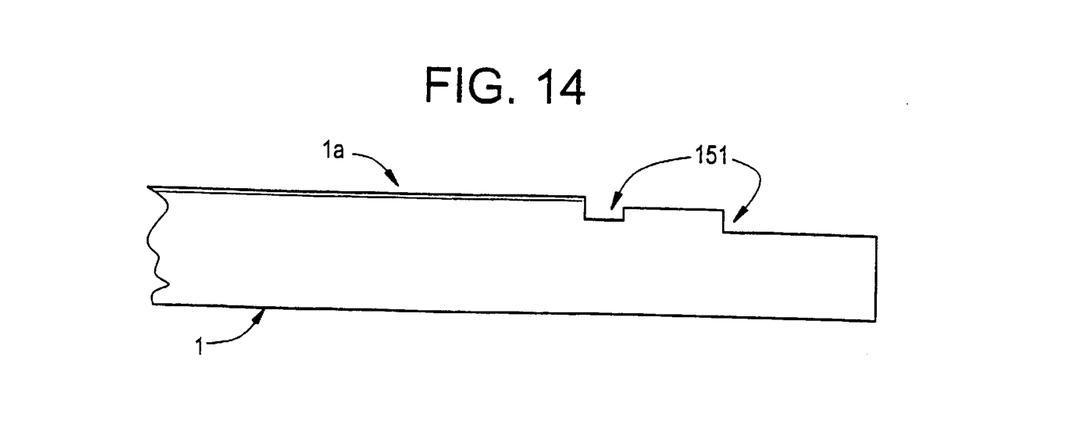
FIG. 14 is diagram showing an alternative stepped chip design for providing a robust connection with a fiber.

In an aspect of the invention, and in order to have a final device that is robust, it is preferred to supplement the fusion joint with a further polymer or mineral joint 25, as illustrated in FIG. 4. The combination of this supplementary joint with the stepped portion 5 of the end of chip 1 ensures a particularly strong supplementary bond between the optical fiber and the waveguide. Alternatively, as shown in FIG. 14, a monolithic chip 1 incorporating waveguide 1a and having stepped portions 152, for connecting with a fiber (not shown) will also provide a robust device.

In the above discussion of the preferred embodiment, an asymmetric temperature distribution is established across the boundary between the waveguide and the optical fiber by offsetting the spot produced by the laser beam from the boundary. However, other means may be adopted for achieving this asymmetrical temperature distribution. For example, the desired distribution can be achieved by using a shield element 20 whose cross sectional shape (perpendicularly to the laser beam 17, 18) is such that the laser beam comprises more energy at positions which will be focused onto the waveguide and relatively less energy at positions which will be focused onto the optical fiber 2. Such a shielding element 20 could, for example, be pear-shaped in cross section. Alternatively, the desired temperature distribution could be obtained by a combination of an offset of the laser beam and the use of a specially-shaped shielding element 20. Shielding elements other than those described hereinabove may also be used for eliminating part of the energy of the laser beam. For example, instead of using a cylinder, another element of circular cross-section, such as a cone, may be employed. Alternatively, elements not presenting a circular cross-section may be used; for example, elements whose section is in the form of a star, ellipse, etc. Theoretically, a similar result is possible by using a shield of circular shape (or of different shape), substantially in two dimensions, or a thin shielding element such as a disc.

Furthermore, a laser other than a $CO_2$ laser may be used as long as the material of the waveguide is capable of absorbing energy at the wavelength of the laser. In the case of a silica waveguide, this condition implies in practice that the wavelength of the laser is greater than about 4 $\mu$m.

Figure 8:
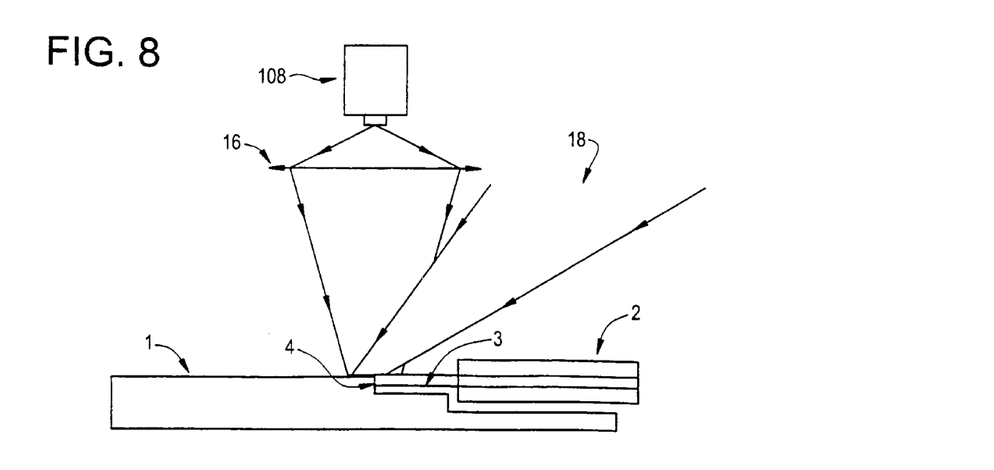
FIG. 8 is a diagram schematically illustrating laser spot position control according to an embodiment of the invention.
Figure 9:
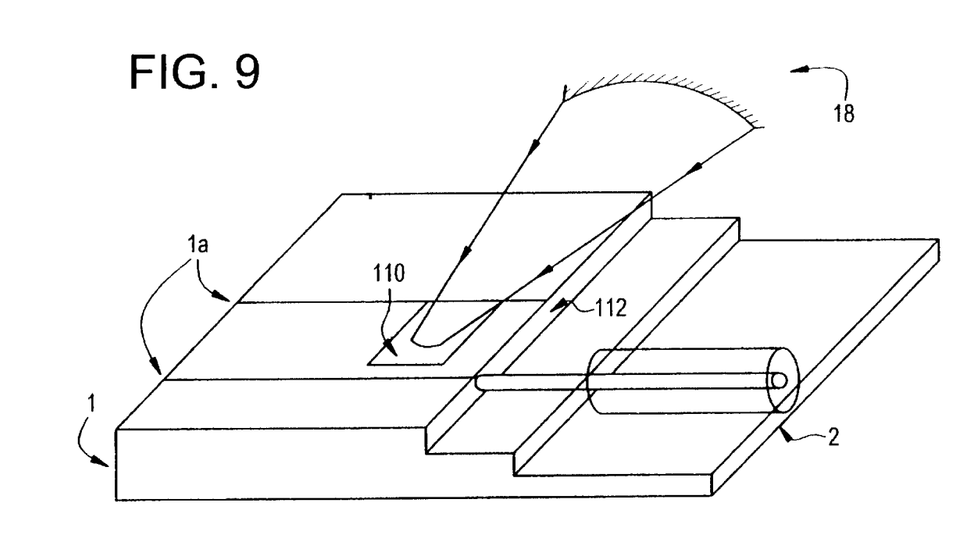
FIG. 9 is a diagram schematically illustrating laser spot position control according to an embodiment of the invention.
Figure 10:
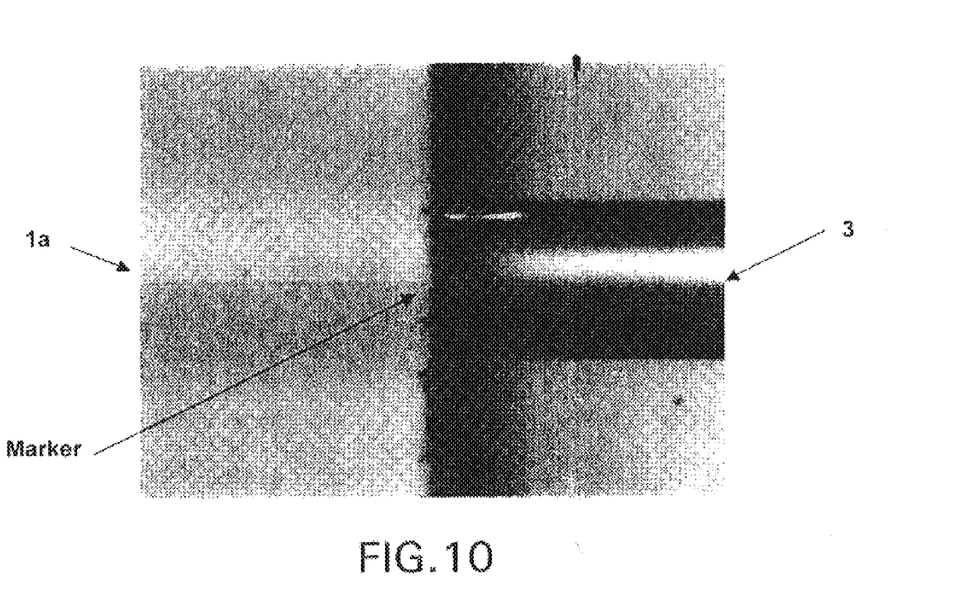
FIG. 10 is a diagram schematically illustrating the waveguide extremity and fiber joint according to an embodiment of the invention.

In a preferred aspect of the embodiment described above, a method for accurately positioning the laser beam at the zone of abutment is described with reference to FIGS. 8–10. Referring first to FIGS. 8 and 9, a camera 108 that is fixed in position relative to the chip 1 and the fiber end 3 to be fused together provides an image in a field of view 110 surrounding and including the zone of abutment 4 between the waveguide and the optical fiber. A low power laser beam 18 from the $CO_2$ laser is focused on the chip within the field of view and image recognition software such as, e.g., Optimas™ by Imasys, is utilized to generate a set of coordinates $x_1, y_1$ corresponding to the position of substantially the center of the focused laser beam. The location of the beam denoted by $x_1, y_1$ is set off from a border (or extremity) 112 of the chip 1 and the waveguide 2 by an amount $\Delta x, \Delta y$. The extremity 112 of the waveguide is also identified and denoted by a set of coordinates $x_2, y_2$. quantity $\Delta X = x_2 - x_1$ and $\Delta Y = y_2 - y_1$ are calculated and the zone of abutment 4 defined as the waveguide extremity/fiber interface are positioned at this coordinate location. With respect to an X-axis that is parallel to the waveguide in the chip, $\Delta x$ is preferably about 300 $\mu$m. For a chip having a waveguide pitch of about 350 $\mu$m, $\Delta y$ is preferably about 175 $\mu$m along a Y-axis normal to the X-axis as shown in the coordinate system accompanying FIG. 9. It will be appreciated, however, that $\Delta y$ will be motivated by the waveguide pitch in all cases.

In an exemplary embodiment, a first image was obtained over a time of about 2–3 seconds, and four subsequent images were obtained at approximately 0.4 seconds after each preceding image. This method allowed the extremity of the waveguide to be positioned to within about ±1 $\mu$m with respect to the approximate laser beam center at the zone of abutment. FIG. 10 shows a marker identifying the extremity 112 of the waveguide 1 and the optical fiber end 3.

Figure 5:
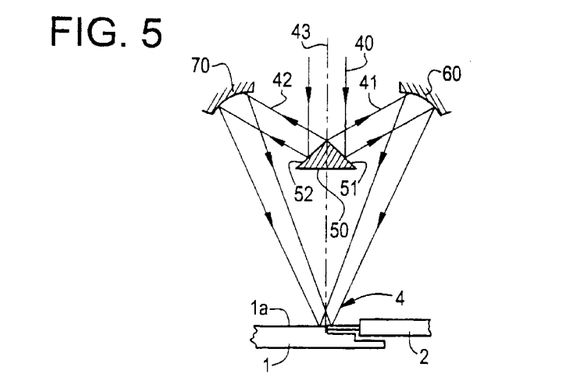
FIG. 5 is a diagram showing an apparatus for carrying out another embodiment of the invention.

In an alternative preferred aspect of the invention as shown in FIG. 5, several laser beams are generated to simultaneously irradiate the zone of abutment. According to this embodiment, a laser beam 40 produced by a laser source (not shown) is directed towards a splitting mirror 50 which splits the beam 40 into two distinct laser beams 41 and 42. Each beam 41, 42 is then reflected by a respective parabolic mirror 60, 70 and focused by this parabolic mirror on the interface 4 between the optical fiber 2 and the waveguide 1a. The splitting mirror 50 is preferably in the form of a triangular prism, of which a median line of the triangular cross-section (in the plane of FIG. 5) substantially merges with the axis 43 of the laser beam 40, and of which two adjacent side faces 51, 52 disposed one either side of the axis 43 are reflecting. The laser beams 41 and 42 reflected respectively by the faces 51, 52 of the splitting mirror 50 are preferably focused by the parabolic mirrors on the zone of abutment 4 between the optical fiber end 3 and the waveguide 1a so as to be superposed thereon. FIG. 6 illustrates the modification of the distribution of energy of the laser beam 40 by the optical elements 50, 60 and 70 during irradiation of the zone of abutment between the optical fiber 2 and the waveguide 1a The Gaussian profile (cf. FIG. 6A) of the energy distribution of the laser beam 40, in a plane perpendicular to that of FIG. 5, before splitting of the beam by the splitting mirror 50, is transformed at the zone of abutment into a substantially rectangular energy profile, shown in broken lines in FIG. 6B. This substantially rectangular profile corresponds to the sum of two Gaussian half-curves respectively associated with the two beams 41, 42.

Figure 7:
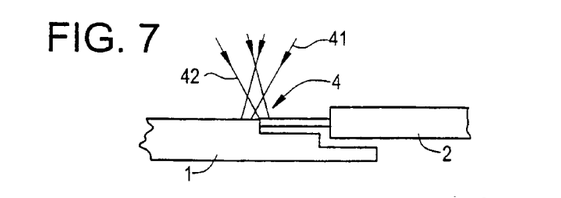
FIG. 7 is a diagram showing a particular arrangement of two laser beams produced by the apparatus of FIG. 5.

The profile of the energy distribution at the zone of abutment 4 between the optical fiber 2 and the waveguide 1a as shown in FIG. 6B therefore presents a central part of which the level of energy has been reduced to become of the same order as that of the remaining peripheral part. In this way, the presence of a maximum of energy at the center of this distribution is avoided. However, it should be noted that the profile of distribution of energy at the zone of abutment is not necessarily rectangular. FIG. 6C shows another example of distribution of energy in which the energy corresponding to a substantially central zone 80 of the energy distribution has been reduced with respect to the remaining peripheral part, i.e. the edges, 81 thereof. In the exemplary profile of FIG. 6C, the energy at the edges 81 is greater than that at center 80. Such a profile is obtained in this embodiment by applying the two laser beams 41, 42 to two different spots at the zone of abutment 4, as shown in FIG. 7. The distribution profile shown in FIG. 6C is substantially the same as that obtained in the first embodiment with the aid of the shielding element 20. In practice, the effect produced in the zone of abutment 4 by the energy distributions of FIGS. 6B and 6C is not very different since, in the case of a distribution of the type of FIG. 6C, the temperature distribution in the zone of abutment between the optical fiber 2 and the waveguide 1a is substantially homogeneous due to the thermal diffusion which is produced in this zone of abutment.

According to an aspect of this embodiment, the laser beams 41, 42 irradiating the zone of abutment 4 between the optical fiber 2 and the waveguide 1a are slightly defocused at this zone of abutment, in order to render the spot produced by the beams 41, 42 slightly blurred at the zone 4. In this way it is possible to spread the energy distribution so as to render the latter more homogeneous. Likewise the beams 41, 42 are preferably applied on the zone of abutment 4 so that the quantity of energy reaching the waveguide 1a is greater than that reaching the optical fiber 2. To that end, the beams 41, 42 are directed towards the zone of abutment 4 so that the spot produced thereby at zone 4 is offset with respect to the boundary between the waveguide 1a and the optical fiber 2, in a direction towards the waveguide.

Another preferred embodiment of the invention describes a method for connecting a plurality of optical fibers to a respective plurality of waveguides in a chip, that is, multi-fiber fusion pigtailing, and is described below with reference to FIGS. 11–13.

Figure 11:
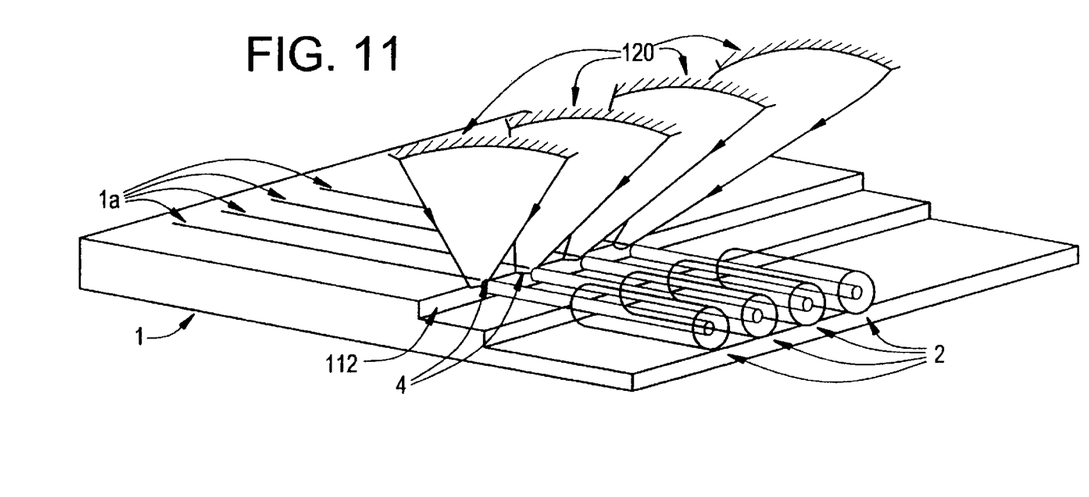
FIG. 11 is a diagram schematically illustrating multi-fiber fusion pigtailing according to an embodiment of the invention.

Referring first to FIG. 11, a silica chip 1 incorporating a number of waveguides 1a to be connected at an extremity 112 of the chip to a respective number of stripped ends 3 of optical fibers 2 is illustrated. A respective number of laser beams 120 are shown irradiating the zones of abutment 4 between the waveguides and the fibers. In order to produce the series of laser beams and their associated intensity profiles as shown in FIG. 11, a diffractive optical element (DOE) 130 as shown in FIG. 13 is inserted in the path of the expanded and collimated laser beam. Depending upon the design of the DOE 130, essentially any desired wavefront or series of wavefronts can be generated resulting in a preferred intensity distribution of the beam at the zones of abutment 4. FIGS. 12A, 12B, 12C and 12D illustrate four different possible beam distributions produced by the DOE 130 including a uniform rectangular distribution 12A; a rectangular distribution having a quasi-Gaussian profile wherein the intensity between the tails and the central portion of the profile varies between about 1 to 10% 12B; a series of square distributions 12C; and a series of circular distributions 12D, the latter two of which have a periodicity or pitch corresponding to that of the fiber/waveguides. The profile represented by 12B is preferred with respect to that of 12A for irradiating chips having a relatively smaller width because of the greater influence of the chip border in a smaller chip on the heat diffusion from the laser beam. Chips of relatively greater width have a less significant influence on the heat diffusion arising from chip border considerations making the profile of 12A more advantageous for use with larger chips. Based upon the manufacturing parameters of the DOE 130, optimized wavefronts can be generated which meet the fusion temperature requirements and the spatial energy distributions at the zones of abutment to fuse the joints while not adversely melting the fiber or warping the substrate as identified above as problems associated with conventional laser fusion methods.

Figures 12A, 12B, 12C, 12D, 13:
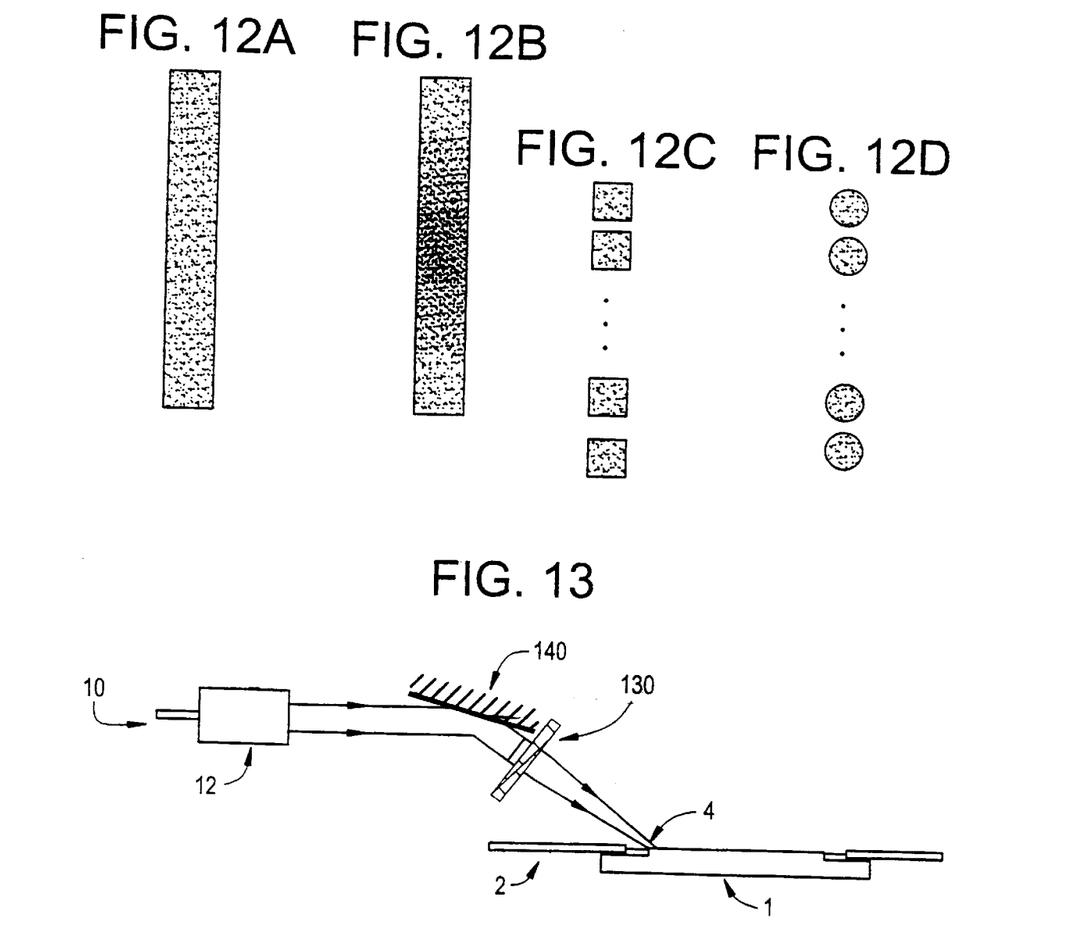
FIGS. 12A, 12B, 12C and 12D are diagrams schematically illustrating laser spot geometries at the zone of abutment according to an embodiment of the invention.
FIG. 13 is a diagram schematically illustrating an optical set-up for multi-fiber fusion pigtailing according to an embodiment of the invention.

As shown in FIG. 13, a $CO_2$ laser 10 generates a beam that is expanded and collimated by component 12. In a preferred embodiment of the invention, the collimated beam is propagated to a reflecting element 140 and then through a DOE 130 which produces a desired intensity distribution at the zones of abutment 4 for multi-fiber fusion pigtailing a series of optical fibers 2 and waveguides 1a in a silica chip 1. The DOE 130 provides the additional function of focusing the beam at the zones of abutment or at least providing a slightly defocused beam as may be suitable for attaining the desired energy distribution at the zones of abutment. However, depending upon DOE cost and design considerations, the focusing function may be performed by an additional appropriate lens element, such as a ZnSe lens (not shown) positioned upstream of the DOE.

In the case of multiple energy distributions irradiating a respective plurality of zones of abutment at the chip interface, it is preferred to accurately position the beam similarly to the single fusion case described above. According to an aspect of the current embodiment, and with reference to FIGS. 8 and 9, a low power intensity distribution from the laser irradiates the chip within a field of view of a camera in order to obtain an image of the laser beam on the chip. In the case of multiple intensity distributions such as in FIGS. 12C and 12D, it is only necessary to obtain an image of a single intensity profile as the periodicity and shape of the totality of profiles are fixed by the design of the DOE as described above. Thus it is possible to obtain from the image obtained via image acquisition software as described herein above, a coordinate $x_1$ corresponding to the position of substantially a center of the beam along an X-axis parallel to the waveguide in the chip, wherein $x_1$ is set off from a border of the chip and the waveguide, respectively, by an amount $\Delta x$. The extremity of the waveguide along the X-axis is assigned the coordinate $x_2$. The waveguide extremity and the optical fiber, which are abutted as described above, are then positioned at a location defined by $\Delta X = x_2 - x_1$. Positioning of the beam according to the method described herein provides a positioning accuracy of $\pm 1\,\mu m$ or better. Such positioning accuracy assures a good reproducibility of the heated area of the zone of abutment which is critical because of the large thermal capacity difference between the silica chip and the optical fiber.

Figure 15:
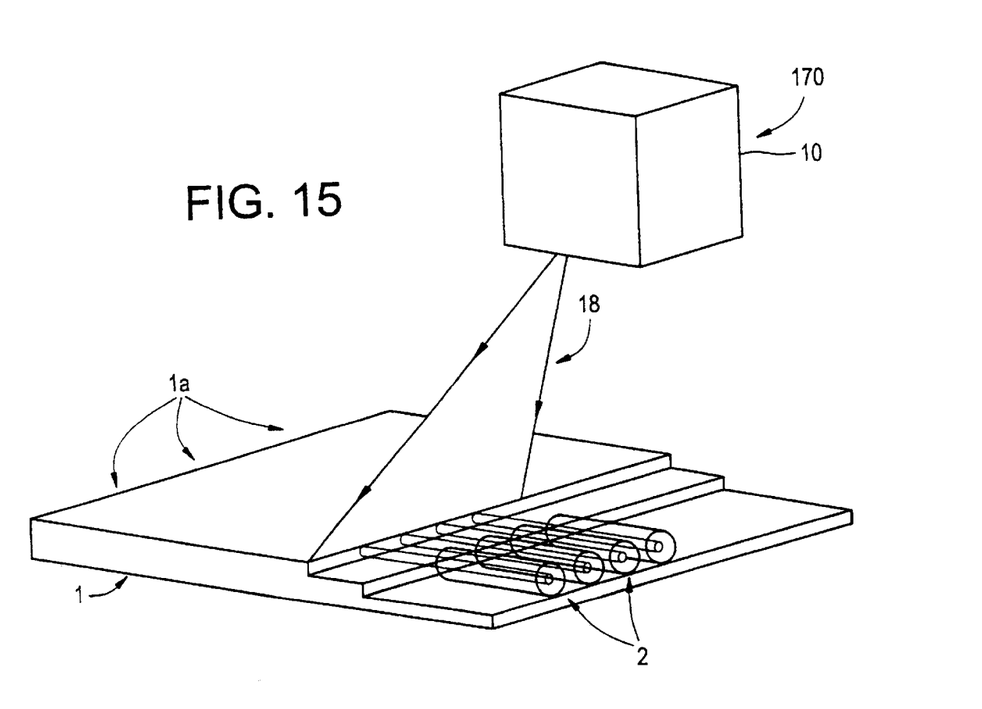
FIG. 15 is a diagram schematically illustrating multi-fiber fusion pigtailing according to another embodiment of the invention.
Figure 16:
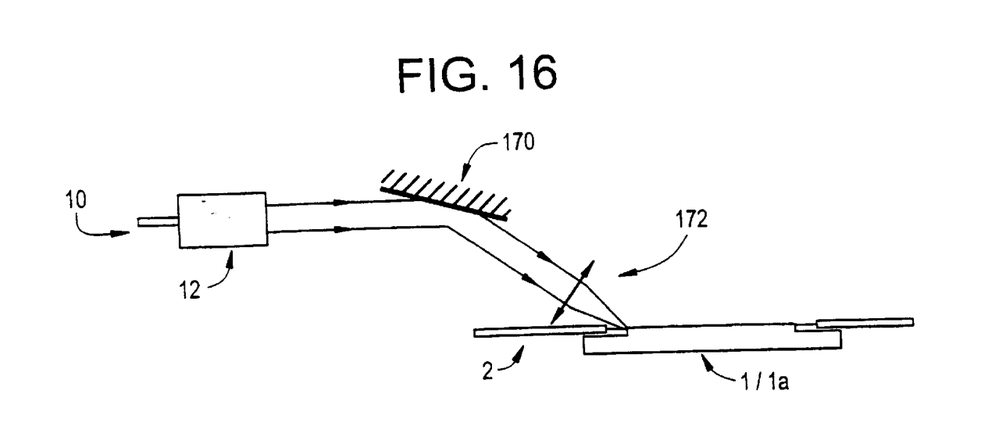
FIG. 16 is a diagram schematically illustrating an optical set-up for multi-fiber fusion pigtailing in accordance with FIG. 15.

Another preferred embodiment of multi-fiber pigtailing will be described with reference to FIGS. 15 and 16, and relates to scanning a laser beam over the multiple zones of abutment to connect multiple fibers to respective waveguides. A laser beam 10 from a $CO_2$ laser is incident on a beam scanner 170 which may comprise, for example, one or more movable mirrors which provide beam steering at least in orthogonal X and Y directions. The beam 10 is expanded and collimated by component 12 and directed to scanner 170. As shown in FIG. 15, scanner 170 further comprises components (not shown) such as a lens or lens system for beam shaping, focusing, wavefront manipulation or other beam processing for optimal irradiation of the chip 1. Alternatively, as shown in FIG. 16, scanner 170 is separate from a lens or lens system depicted by reference 172. In this embodiment, all fiber/waveguide connections are substantially simultaneously heated by the scanning laser beam. A typical scanning frequency is on the order of 100 Hz–10 kHz. Positioning of the chip/waveguide with respect to the laser spot is substantially to the method described above for the single fusion case. When the scanner 170 is in a non scanning mode, the laser beam spot size is the same as in the single fusion case. Thus the coordinates of the beam center, the waveguide extremity and the offset are calculated and processed as in the single fusion case.

Although the present invention has been described with reference to particular embodiments, it is to be understood that various modifications may be made thereto without departing from the scope of the invention as defined in the accompanying claims.

What is claimed is:

1. A method for connecting an optical fiber to an optical waveguide in a chip, comprising the steps of:

aligning the optical fiber with the waveguide;

bringing the optical fiber and waveguide into abutment;

emitting a laser beam from a laser;

modifying the laser beam by blocking a portion of the laser beam such that the energy corresponding to substantially central part of the spatial energy distribution of the laser beam is reduced; and irradiating a zone around the abutted optical fiber and waveguide with the modified laser beam, thereby coupling the optical fiber to the waveguide.

2. The method according to claim 1, wherein the step of reducing said spatial energy distribution comprises disposing a shield in the path of the laser beam upstream of said zone of abutment to eliminate a substantially central part of the laser beam while allowing a peripheral part thereof to pass.

3. The method according to claim 2, wherein between 20% and 80% of the power of the laser beam is eliminated by the shield upstream of the zone of abutment between the optical fiber and the waveguide.

4. The method according to claim 2, wherein about 50% of the power of the laser beam is eliminated by the shield.

5. The method according to claim 1, wherein the step of irradiating the zone of abutment comprises focusing the laser beam substantially on the zone of abutment.

6. The method according to claim 1, wherein the step of irradiating the zone of abutment comprises slightly defocusing the beam on said zone of abutment.

7. The method according to claim 2, wherein the shield is substantially cylindrical in shape and a long axis of the cylinder is arranged in the path of the laser beam with the axis aligned with a direction of propagation of the laser beam.

8. The method according to claim 1, wherein said step of irradiating the zone of abutment comprises splitting, upstream of said zone of abutment, the laser beam into a plurality of beams and directing the beams towards said zone of abutment.

9. The method according to claim 8, wherein said plurality of beams are slightly defocused at said zone of abutment.

10. The method according to claim 1, wherein the spatial energy distribution is such that the amount of energy which irradiates the waveguide is greater than the amount which irradiates the optical fiber.

11. The method according to claim 1, wherein said step of irradiating the zone of abutment comprises the laser beam at said zone of abutment having a diameter, further wherein the beam is offset with respect to a boundary between the optical fiber and the waveguide, towards the waveguide by a distance of about 5–20% of said diameter.

12. The method according to claim 1, wherein, during irradiation of the zone of abutment, a force is applied between the optical fiber and the waveguide so as to move them closer together.

13. The method according to claim 12, wherein said force causes a relative displacement less than or equal to about 50 $\mu$m.

14. The method according to claim 1, further comprising the step of forming a further connection between the optical fiber and the waveguide using a bonding substance.

15. The method according to claim 1, wherein the laser power is at a first, relatively higher level during a first period of time during which a fusion joint is formed between the optical fiber and waveguide, and is at a lower level during a second period of time, subsequent to the first period of time, to allow a gradual cooling of the fusion joint.

16. The method according to claim 1, wherein the waveguide is formed in a silica chip.

17. The method according to claim 1, wherein the laser beam has a wavelength greater than 4 $\mu$m.

18. The method according to claim 17, wherein the laser is a $CO_2$ laser.

19. The method of claim 1, wherein an extremity of the waveguide is positioned to within about ±1 $\mu$m with respect to the laser beam center at the zone of abutment.

20. A method of connecting a plurality of optical fibers to a respective plurality of waveguides in a chip, comprising the steps of:

aligning the optical fibers with the respective waveguides;

abutting the optical fibers to the respective waveguides; and propagating a laser beam through a diffractive optical element to simultaneously produce a desired spatial laser energy distribution at a zone of abutment for each of the plurality of connections, thereby coupling the optical fibers to the respective waveguides.

21. The method of claim 20, wherein the spatial energy distribution of the laser beam on the chip has a two dimensional shape comprised of one of at least one rectangle, and at least one square, and at least one circle.

22. The method of claim 20, wherein the diffractive optical element is positioned downstream from a focusing lens.

23. The method of claim 20, wherein said diffractive optical element is used to focus said laser beam on said chip.

24. The method of claim 20, wherein said laser beam has a wavelength equal to or greater than 4 $\mu$m.

25. The method of claim 24, wherein said laser is a $CO_2$ laser.

26. A method of connecting a plurality of optical fibers to a respective plurality of waveguides in a chip, comprising the steps of:

aligning the optical fibers and respective waveguides;

abutting the optical fibers to the respective waveguides;

propagating a laser beam to a beam scanner; and the laser beam having a desired spatial energy distribution over a plurality of zones of abutment between the plurality of optical fibers abutted against the respective plurality of waveguides and the chip, whereby the plurality of zones of abutment are substantially heated simultaneously, thereby coupling the optical fibers to the respective waveguides.

27. The method of claim 26, wherein the beam is scanned with a repetition rate of between about 1000 Hz–10 kHz.

28. The method of claim 20, wherein the spatial energy distribution of the laser beam on the chip has a two-dimensional shape comprising a rectangle.

29. The method of claim 20, wherein the spatial energy distribution of the laser beam on the chip has a two-dimensional shape comprising a series of rectangles.

30. The method of claim 20, wherein the spatial energy distribution of the laser beam on the chip has a two-dimensional shape comprising a series of circles.

* * * * *